US 6,400,710 B1

(12) United States Patent
Golden et al.

(10) Patent No.: US 6,400,710 B1
(45) Date of Patent: Jun. 4, 2002

(54) NETWORK WITH HOT BUTTON FOR PROVIDING SWITCHED BROADBAND MULTIPOINT/MULTIMEDIA INTERCOMMUNICATION

(75) Inventors: Michael E. Golden, Pleasanton; Richard Edward Cobb, Jr., San Francisco; Nancy Virginia Commons, Tracy, all of CA (US)

(73) Assignee: Enron Warspeed Services, Inc., Pleasanton, CA (US)

( * ) Notice: Subject to any disclaimer, the term of this patent is extended or adjusted under 35 U.S.C. 154(b) by 0 days.

(21) Appl. No.: 09/351,405

(22) Filed: Jul. 9, 1999

(51) Int. Cl.[7] .............................................. H04L 12/26
(52) U.S. Cl. ...................................... 370/352; 370/389
(58) Field of Search ................................ 370/352, 389, 370/392, 383, 390, 401, 410, 408, 400, 522, 353, 351, 259, 369, 209; 709/229, 204, 227, 202, 243

(56) References Cited

U.S. PATENT DOCUMENTS

| | | | | |
|---|---|---|---|---|
| 5,867,495 A | * | 2/1999 | Elliott | 370/352 |
| 6,185,619 B1 | * | 2/2001 | Joffe | 709/222 |
| 6,192,050 B1 | * | 2/2001 | Stovall | 370/389 |

* cited by examiner

Primary Examiner—Douglas Olms
Assistant Examiner—Ricardo M. Pizarro
(74) Attorney, Agent, or Firm—Andrews & Kurth Mayor, Day, Caldwell & Keeton, L.L.P.

(57) ABSTRACT

By accessing a hot button available from an internet site, a user can make a request for a switched broadband connection from a control system associated with a broadband network. The control system allocates resources for the broadband connection and coordinates a request with the web host. Accordingly, the web host is capable of providing bandwidth-differentiated services to users making such requests.

23 Claims, 2 Drawing Sheets

NETWORK WITH HOT BUTTON FOR PROVIDING SWITCHED BROADBAND MULTIPOINT/MULTIMEDIA INTERCOMMUNICATION

BACKGROUND OF THE INVENTION

1. Field of the Invention

The present invention relates to multimedia communications and, more particularly, to a network for providing a means of enabling on-demand broadband access to specialized web page content.

2. Description of the Related Art

A public packet switched network such as the World Wide Web generally cannot provide the bandwidth necessary for multimedia communications requiring broadband connections. Web traffic is slow, and access is limited to specific languages and protocols such as HTML, FTP, etc. Moreover, even with these limitations, web providers cannot easily provide bandwidth-differentiated services to different customers.

Application Ser. No. 08/966,634 (application Ser. No. 08/966,634), commonly owned by the present assignee, dramatically advanced the state of the art. The present invention leverages the capabilities of application Ser. No. 08/966,634 in new and useful ways. In particular, the present application allows a broadband network user to access a web page with a hot button for on-demand broadband web access.

SUMMARY OF THE INVENTION

The present invention aims at allowing a user to request a broadband connection by means of a hot button available from an internet site to overcome limitations of slow transmissions in a public packet switched network.

The present invention aims at allowing a user to request a broadband connection by means of a hot button available from an internet site, where the hot button request provides a destination field for addressing a web host and an annotation field for identifying associated user software.

The present invention aims at allowing a user to request a broadband connection by means of a hot button available from an internet site, where a corresponding web host can provide bandwidth-differentiated services to users making such requests.

These objects and advantages are fulfilled according to the present invention by a method that allows a user to access a hot button available from an internet site. Accessing the hot button makes a request for a switched broadband connection from a control system associated with a broadband network. The control system allocates resources for the broadband connection and coordinates a request with the web host. Accordingly, the web host is capable of providing bandwidth-differentiated services to users making such requests.

BRIEF DESCRIPTION OF THE DRAWINGS

Those skilled in the art will be able to understand the details of the invention, as well as the best mode for practicing it, by reference to the following detailed description, in conjunction with the attached drawing figures, in which.

DETAILED DESCRIPTION OF THE PREFERRED EMBODIMENTS

This application builds upon the disclosure of co-pending U.S. application Ser. No. 08/966,634, commonly owned by the assignee of the present invention, incorporated herein by reference. Application '634 discloses a network for providing switched broadband interconnections according to the present invention. The present invention provides a streamlined mechanism for a user to request a switched broadband connection to a web host in such a network by means of a hot button available from an internet site, thus further allowing the web host to provide differentiated services to different customers.

Figure 1:
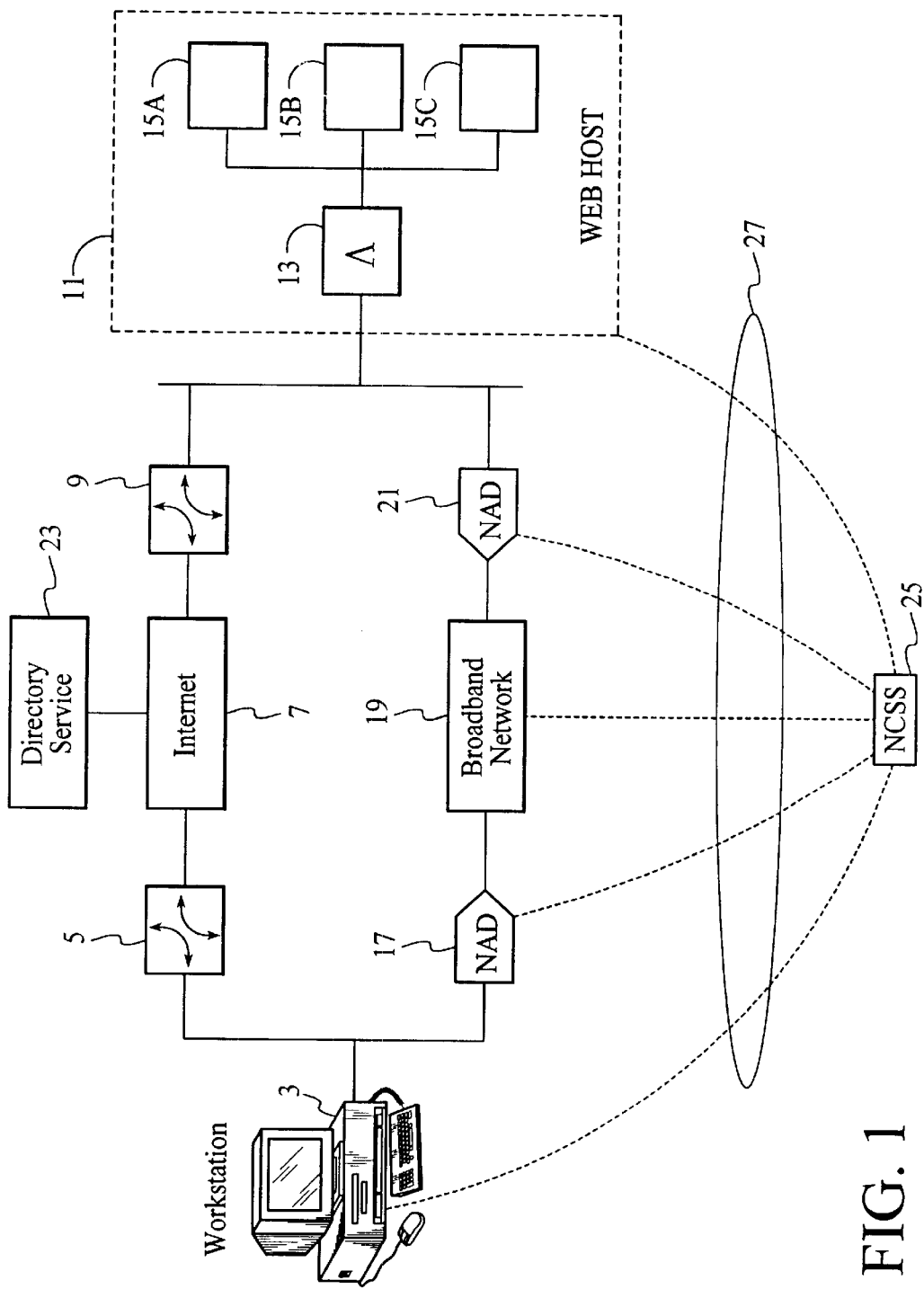
FIG. 1 illustrates a top-level functional diagram of a preferred embodiment of a network in accordance with the present invention.

As illustrated in FIG. 1, a preferred embodiment of the present invention includes a user's workstation 3, which connects via a redirector 5 to an internet 7, which provides a public packet switched network. Internet 7 also connects via a redirector 9 to a web host 11, which includes a load balancer 13, which manages flow to alternative servers 15A–15C. A directory service 23 is also accessible to workstation 3 via internet 7. A broadband network 19 also provides an alternative broadband routing from workstation 3 to web host 11. Workstation 3 connects via NAD (Network Access Device) 17 to broadband network 19, which provides on-demand broadband services via a public circuit-switched network as described in co-pending application Ser. No. 08/966,634. Broadband network 19 also connects via NAD 21 to web host 11. NCSS (Network Control System Server) 25 communicates with workstation 3, NAD 17, broadband network 19, NAD 21 and web host 11 via signaling network 27.

Details for preferred embodiments of many of these components are described in more detail in application Ser. No. 08/966,634. Broadband network 19 is illustrated in application Ser. No. 08/966,634 by a top-level functional diagram in FIG. 1 and a connection-topology diagram in FIG. 49. Workstation 3 can be implemented by the workstation and the workstation interface of application Ser. No. 08/966,634 (e.g., workstation 100-A and workstation interface 140-A in FIG. 49). NAD 17 and NAD 21 may be implemented by, for example, premises switches 110-A and 110-B in FIG. 49 of application Ser. No. 08/966,634. Redirectors 5 and 9 may be standard CISCO redirectors (e.g., model numbers 2514, 2600, 4000, 7000, 7500). Key components of web host 11 include load balancer 13 (e.g., CISCO "LocalDirector 430"), and alternative servers 15A–15C. NCSS 25 can be implemented, for example, by NCSS 40 of application Ser. No. 08/966,634. Signaling network 27 can be implemented, for example, by signaling network 30 of Application '634.

From internet 7, the user has access to a directory service 23, which includes software that allows the user to request a switched broadband connection between workstation 3 and web host 11. This database includes information for effecting a broadband connection between the two sites and for running related application software. In general, information provided by directory service 23 to the user at workstation 3 includes the destination information and the annotation.

The destination information provides broadband addressing information for web host 11. This data, which may include the preferred quality-of-service for the connection, has the form:

http://four11.warpspeed.net/destination/<sitename>.mc

The annotation provides information on any application software that must be run on workstation 3 during the broadband connection. This may, for example, include browser software as well as other more specialized software (e.g., communications, CAD). Preferably this data is formatted according to a standard such as Internet RFC 2141 and RFC 1630 and is open within the constraints set by the RFC. Application developers and integrators may then add information necessary for the application up to the length limit for the URL (e.g., approximately 2 KB).

Figure 2:
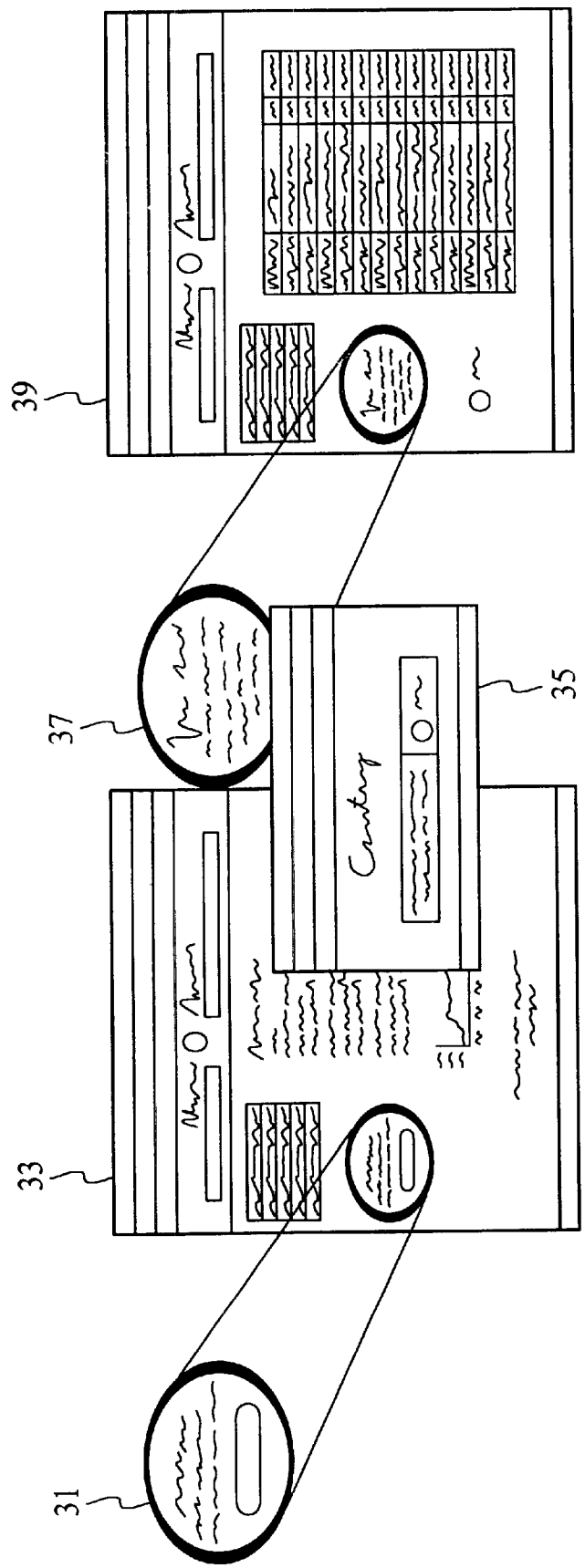
FIG. 2 illustrates of the use a preferred embodiment of a hot button by a user to request a broadband connection in accordance with the present invention.

An illustration of the operation of a preferred embodiment of the present invention is shown in FIG. 2. Directory service 23 provides workstation 3 with an internet web page 33 which includes a hot button 31, thus providing the user with a request capability. By accessing hot button 31, the user is able to request a switched broadband connection that is effected by NCSS 25 of broadband network 19 (i.e., network control system server 40 in FIGS. 1 and 49 of application Ser. No. 08/966,634). The resulting connection leads to a web page 39 including a broadband button 37 that allows the user to take further advantage of the broadband connection by initiating applications such as video conferencing.

As discussed above, when a request is made via hot button 31, information provided by directory service 23 to the user at workstation 3 includes the destination information and the annotation. The interface of workstation 3 uses the annotation to set up streams for the necessary media devices (e.g., camera, microphone, speaker, video display). The interface of workstation 3 also formats a request (based on the annotation and the destination information) that is sent to NCSS 25 of broadband network 19 as components of a request for a switched broadband connection.

NCSS 25 of broadband network 19, having a pre-calculated list of routes between workstation 3 and web host 11 via switch resources under control of the broadband network, broadcasts a request for bandwidth to all the switch commanders with underlying switch resources along the listed routes, as well as NAD's 17 and 21 as explained in application Ser. No. 08/966,634. The switch commanders and the NAD's respond with the amount of bandwidth they have available. Once a route with the required bandwidth has been identified and the necessary resources have been reserved along that route, NCSS 25 of broadband network 19 sends a request to web host 11, where the request can be received by any of alternative servers 15A–15C. When the request has been accepted by one of alternative servers 15A–15C, necessary streams are set up at web host 11 for at least one of alternative servers 15A–15C, and a reply is sent to the control system of switched network 19.

When the reply from web host 11 is received, the control system of switched network 19 instructs the switch commanders that have reserved the underlying switch resources for the connection to switch up the connection. When the switch commanders all reply that the connection has been effected, NCSS 25 instructs workstation 3 to adjust its routing table to access web host 11 via NAD 17 rather than redirector 5 (and vice versa for web host 11, except that this routing update is broadcast to all servers 15A–15C), sends these addresses to workstation 3 and web host 11 and the broadband connection begins. At web host 11, load balancer 13 mediates all input and output so that the resources of alternative servers 15A–15C can be allocated without adversely affecting the transmissions to and from workstation 3. Regardless of which one of alternative servers 15A–15C receives the original request, all of alternative servers 15A–15C where necessary streams are set up will need to get to workstation 3 via the IP address of NAD 21 through a multicast message.

After the connection is made, both workstation 3 and some combination of alternative servers 15A–15C begin formatting locally available data for transmission and correspondingly translate data received in the broadband connection. More details of the network connection operation as applied to two workstations are found in application Ser. No. 08/966,634, "IV Network Connection Operation", pp. 134–136.

The present invention possesses a number of distinct advantages.

For example, web page 33 includes hot button 31 within normal page content, so that it is available directly from internet 7, which generally represents a public packet switched network. (More generally, internet 7 may be any type of network such as WAN/LAN/MAN.) From workstation 3, the simple selection of hot button 31 effectively supplies the user with destination and annotation fields, requests a connection, and configures the user with the appropriate application software. One of alternative servers 15A–15C will receive the IP address of workstation 3 by being routed through NAD 21, but all of these servers will receive the address via a multicast message. By selecting, possibly in a dynamic fashion, which of alternative servers 15A–15C is used, load balancer 13 allows the resources of web host 11 to be used effectively.

Although the present invention has been described in detail with reference to the preferred embodiments thereof, those skilled in the art will appreciate that various substitutions and modifications can be made thereto without departing from the spirit and scope of the invention as defined by the appended claims. For example, separate elements of the invention can be combined to form element subsystems. In addition, many elements can be implemented in hardware, in software or in some combination thereof

We claim:

1. A network for establishing a connection between a workstation and a web host over a circuit-switched infrastructure, said infrastructure being one of a physical and a virtual circuit-switched infrastructure, said workstation and said web host having respective IP addresses, said network comprising:

a network control system server that operates to establish a circuit of said circuit-switched infrastructure between said workstation and said web host in accordance with a route determined on a basis of said respective IP addresses of said workstation and said web host; and a directory service accessible to said workstation over an internet, wherein said directory service operates to provide to said workstation a hot button for requesting the circuit of said circuit-switched infrastructure between said workstation and said web host.

2. A network as claimed in claim 1, wherein said infrastructure is a physical circuit-switched infrastructure.

3. A network as claimed in claim 1, wherein said infrastructure is a virtual circuit-switched infrastructure.

4. A network as claimed in claim 1, wherein said web host includes a load balancer and a plurality of alternative servers, said load balancer operating to balance bandwidth requests to said web host among said alternative servers.

5. A network as claimed in claim 1, wherein a request made with said hot button includes destination information for said web host and an annotation for an application.

6. A network as claimed in claim 5, wherein the annotation includes information for specifying at least one data stream for the application in said circuit-switched infrastructure.

7. A network as claimed in claim 1, further comprising:

a plurality of network access devices; and a signaling network, wherein said network access devices connect said workstation and said web host to said network, said network control system server having an ability to calculate routes or contain a pre-calculated list of routes between said workstation and said web host, said routes including switch resources that are controlled by said network, and said network control system server responds to a request made with said hot button by using said signaling network to broadcast a request for bandwidth to the switch resources associated with said calculated or pre-calculated list of routes.

8. A network as claimed in claim 7, wherein said network control system server responds to said request made with said hot button by using said signaling network to broadcast a request for bandwidth to said web host.

9. A network as claimed in claim 8, wherein
said web host includes a load balances and a plurality of alternative servers, said load balancer operating to balance bandwidth requests to said web host among said alternative servers, and
said network control system server responds to bandwidth responses from said switch resources and at least one of said alternative servers by setting up a data stream in said broadband network between said workstation and said at least one of said alternative severs.

10. A method of providing on-demand variable bandwidth for a connection between a workstation and a web host, both having respective IP addresses in a network, said method comprising:
receiving a request from said workstation for establishing a connection, said request being made via a hot button associate with a directory service accessible to said workstation via an internet;
identifying said respective IP addresses;
determining a route between said workstation and said web host in a circuit-switched infrastructure based on said respective IP addresses; and
establishing a circuit in the circuit-switched infrastructure between said workstation and said web host according to said route, said circuit being one of a physical circuit and a virtual circuit.

11. A method as claimed in claim 10, wherein said circuit is a physical circuit.

12. A method as claimed in claim 10, wherein said circuit is a virtual circuit.

13. A method as claimed in claim 10, wherein said web host includes a load balancer and a plurality of alternative servers, said load balancer operating to balance bandwidth requests to said web host among said alternative servers.

14. A method as claimed in claim 10, wherein the request made with said hot button includes destination information for said web host and an annotation for an application.

15. A method as claimed in claim 14, wherein the annotation includes information for specifying at least one data stream for the application in said circuit-switched infrastructure.

16. A method as claimed in claim 10, further comprising:
calculating a list of routes between said workstation and said web host, said routes including switch resources that are controlled by said circuit-switched infrastructure; and
responding to the request made with said hot button by broadcasting a request for bandwidth to the switch resources associated with said list of routes.

17. A method as claimed in claim 16, further comprising:
responding to said request made with said hot button by broadcasting a request for bandwidth to said web host.

18. A method as claimed in claim 17, wherein said web host includes a load balancer and a plurality of alternative servers, said load balancer operating to balance bandwidth requests to said web host among said alternative servers, the method further comprising:
responding to bandwidth responses from said switch resources and at least one of said alternative servers by setting up a data stream in said circuit-switched infrastructure between said workstation and said at least one of said alternative servers.

19. A web host, adapted to be connected to an internet and a broadband network, comprising:
a load balancer coupled to both the internet and the broadband network, wherein the load balancer communicates with a user over a circuit-switched route established in the broadband network, said web host and user having respective IP addresses and said routes being determined on a basis of said respective IP addresses; and
a plurality of alternative servers, wherein
said load balancer operates to balance broadband allocations among said alternative servers based on broadband requests to said web host, the broadband requests being made through a directory service accessible from the internet.

20. A web host, as claimed in claim 19, wherein
said load balancer operates to select a first server of said alterative servers in response to the broadband request, and
said first server operates to respond to the user making the broadband request through the broadband address.

21. A method of balancing resources among a plurality of alternative servers with access to an internet and to a circuit-switched broadband network, comprising:
providing broadband addressing information for a directory service accessible from the internet; and
providing circuit-switched broadband connections from a user to the alternative servers based on a broadband request made from the directory service.

22. The method of claim 21, wherein providing broadband connections comprises:
receiving a broadband request for the user from a network control system server associated with the broadband network;
selecting a first server among the alternative servers to respond to the broadband request;
responding to the broadband request, the first server signaling a broadband allocation to the network control system server;
receiving a broadband network address for the user from the network control system server; and
responding to the user making the broadband request through the broadband address, the first server providing the broadband allocation to the user via the broadband network.

23. The method of 22, further comprising:
receiving an internet address for the user from the network control system server, and
responding to the user making the broadband request through the internet address.

* * * * *

UNITED STATES PATENT AND TRADEMARK OFFICE
CERTIFICATE OF CORRECTION

PATENT NO. : 6,400,710 B1  
DATED : June 4, 2002  
INVENTOR(S) : Golden et al.

It is certified that error appears in the above-identified patent and that said Letters Patent is hereby corrected as shown below:

Title page,
Item [73], delete "Warspeed", insert -- Warpspeed --

Column 5,
Line 9, delete "balances", insert -- balancer --
Line 24, delete "associate", insert -- associated --

Column 6,
Line 15, delete "routes", insert -- route --

Signed and Sealed this

Tenth Day of September, 2002

Attest:

Attesting Officer

JAMES E. ROGAN
Director of the United States Patent and Trademark Office